United States Patent [19]

Quinting

[11] Patent Number: 4,986,570
[45] Date of Patent: Jan. 22, 1991

[54] ATTACHMENT MECHANISM

[75] Inventor: Franz R. Quinting, Rochester Hills, Mich.

[73] Assignee: Chrysler Corporation, Highland Park, Mich.

[21] Appl. No.: 455,727

[22] Filed: Dec. 22, 1989

[51] Int. Cl.⁵ ............................................. B60R 22/00
[52] U.S. Cl. ................................... 280/808; 297/483; 297/486
[58] Field of Search ............... 280/808, 804, 802, 801; 296/483, 486

[56] References Cited

U.S. PATENT DOCUMENTS

| | | | |
|---|---|---|---|
| 4,225,185 | 9/1980 | Krzok | 297/468 |
| 4,322,097 | 3/1982 | Provensal | 280/808 |
| 4,334,701 | 6/1982 | Takada | 280/804 |
| 4,398,749 | 8/1983 | Hipp et al. | 280/801 |
| 4,469,352 | 9/1984 | Korner et al. | 280/808 |
| 4,473,243 | 9/1984 | Ogawa | 280/808 |
| 4,611,825 | 9/1986 | Patterson | 280/808 |
| 4,702,491 | 10/1987 | Meyer | 280/801 |
| 4,786,081 | 11/1988 | Schmidt | 280/808 |
| 4,840,405 | 6/1989 | Escaravage | 280/808 |

FOREIGN PATENT DOCUMENTS 2348716  4/1976  France ................... 280/808

*Primary Examiner*—Kenneth R. Rice
*Attorney, Agent, or Firm*—Edward P. Barthel

[57] ABSTRACT

The drawings and accompanying description disclose an attachment mechanism for a vehicular shoulder belt, which is readily attachable and quickly removable as a complete assembly from a mounting bolt threadedly secured to the roof rail adjacent the rear seat of a vehicle, such as a station wagon. The attachment mechanism includes a base member having a keyhole opening therein for mounting on the bolt, a leaf spring adapted to lie in part against the base member and retain the bolt head in the smaller portion of the keyhole opening after being deflected to permit the bolt head to pass through the larger portion of the keyhole opening, and a partially exposed pivotable actuating member operatively connected intermediate the base member and leaf spring for manually urging the leaf spring past the bolt head to permit removal of the attachment mechanism from the bolt via the larger keyhole opening portion.

7 Claims, 2 Drawing Sheets

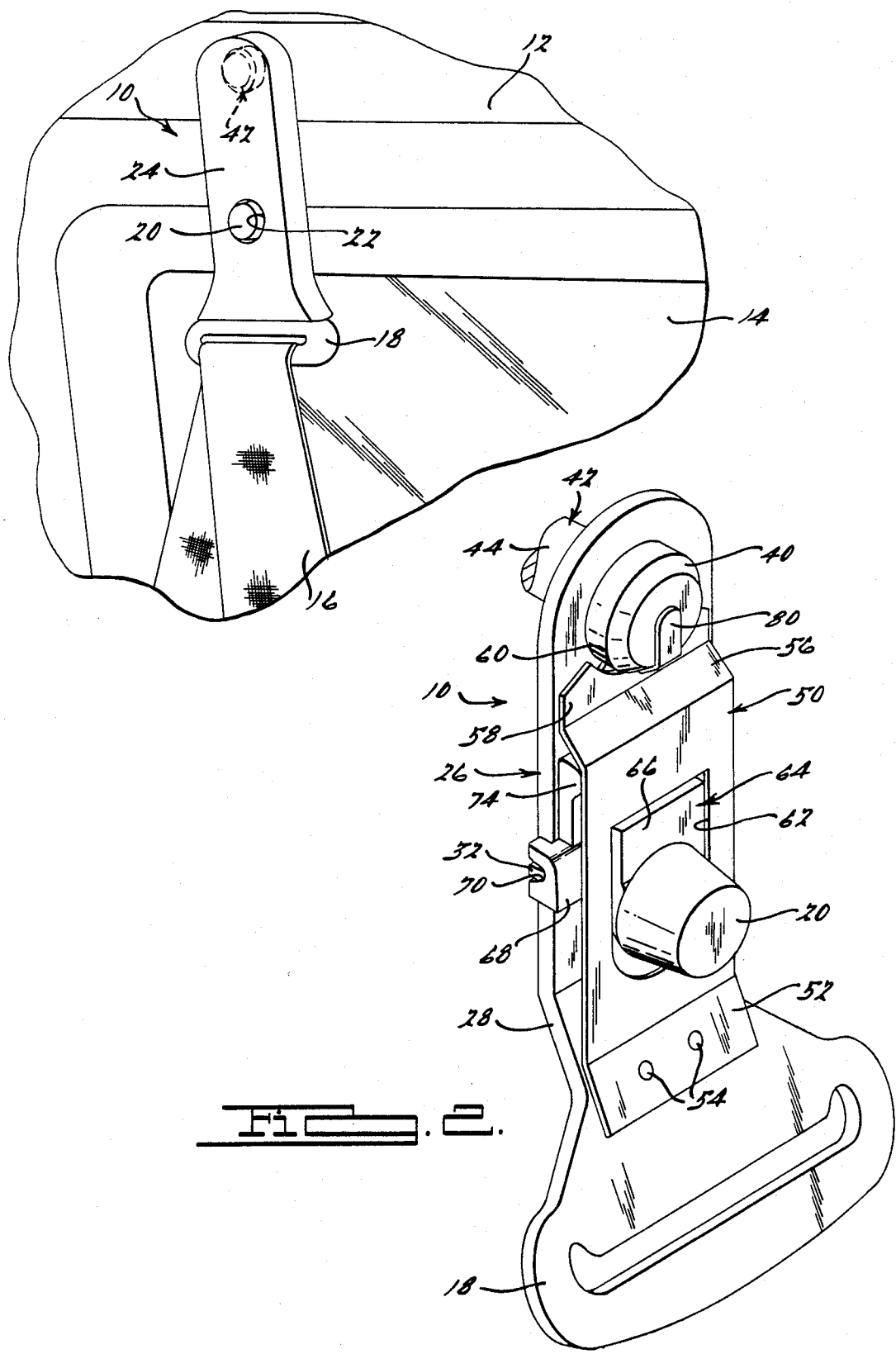

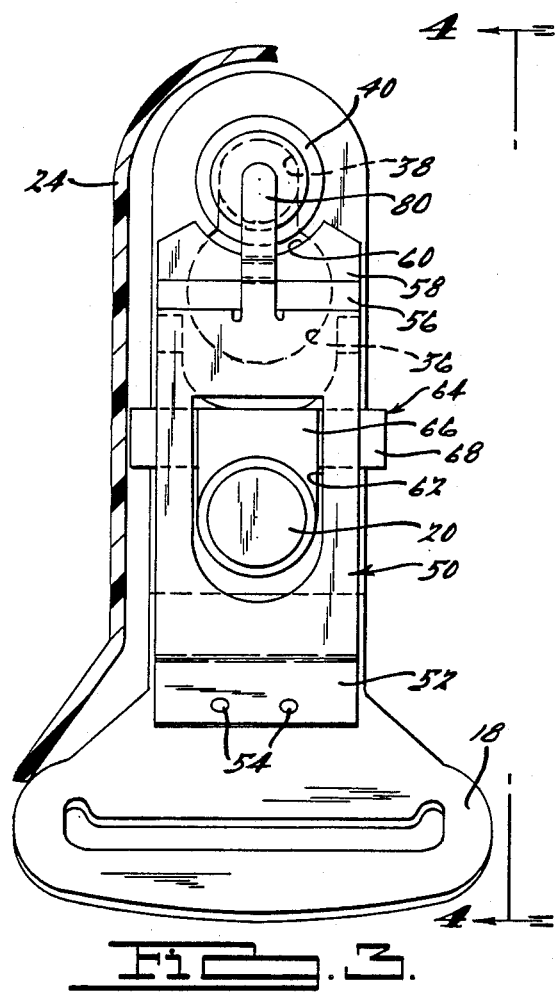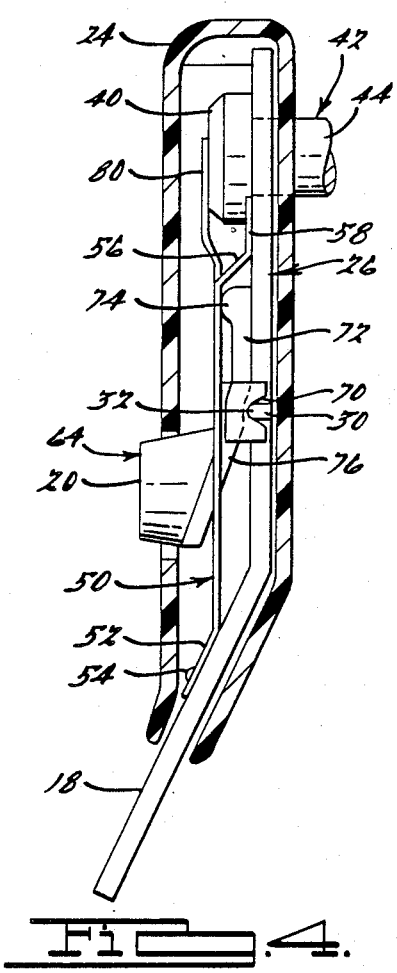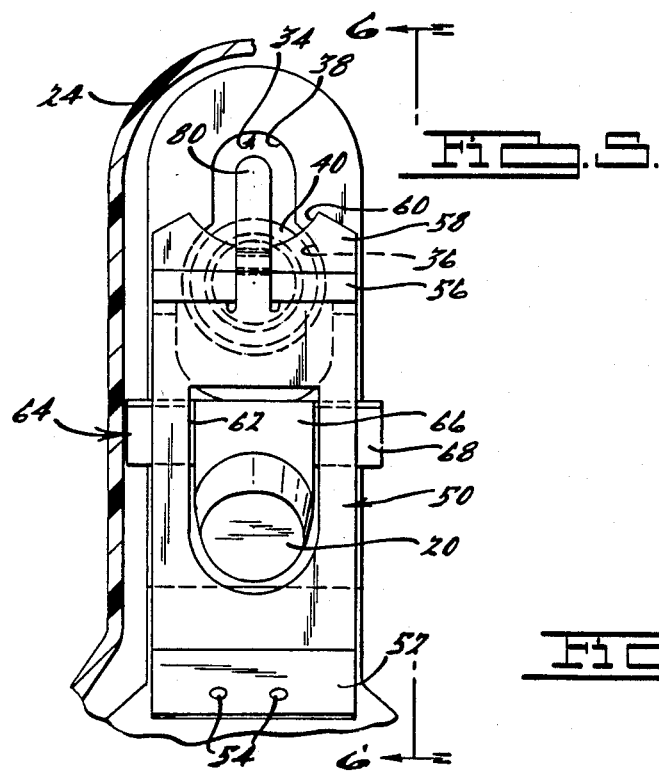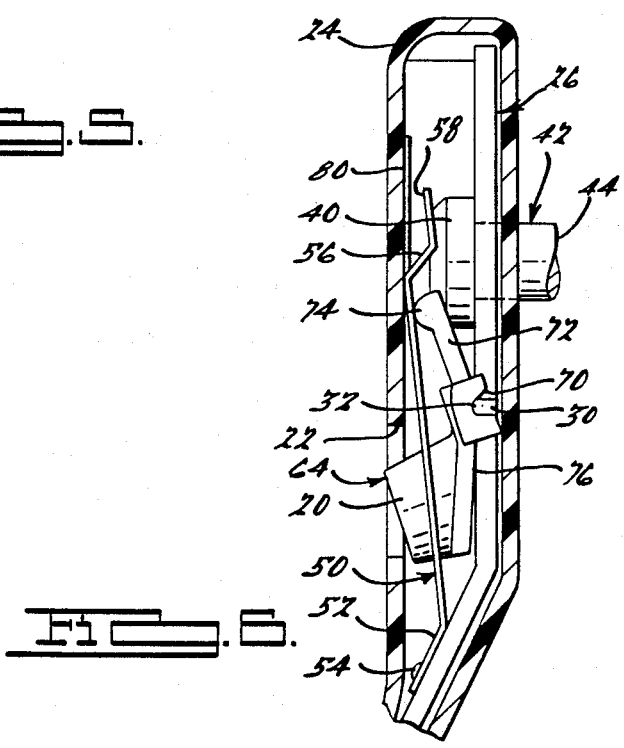

ATTACHMENT MECHANISM

TECHNICAL FIELD

This invention relates generally to attachment mechanism and, more particularly, to a quick-connect and quick-disconnect attachment mechanism for shoulder belts for the rear seat of a vehicle.

BACKGROUND ART

There are in existence various mechanisms for connecting and disconnecting shoulder belts from the rear window or door frames of automotive vehicles such as station wagons, for example, when it is desirable to remove the back seat therefrom for hauling purposes. Many of these include keyhole openings and/or leaf spring coupling components, but many easily removable types do not include a positive locking action.

Two coupling arrangements are shown and described in Takada Pat. No. 4,334,701. One embodiment includes a keyhole opening for attachment of a plate carrying a shoulder belt to a bolt-like coupling pin with resiliently deformable tangs which spring back to engage the edge of the plate once the shank portion of the pin enters the smaller portion of the keyhole opening, thus preventing the coupling from being disconnected during normal use.

Another embodiment of the No. 4,334,701 patent includes a pair of plates and a leaf spring. One plate includes a bolt-like coupling pin and a T-shaped projection, while the second plate includes a keyhole opening and a contoured slot. The leaf spring is connected by rivets to the latter plate, and is deflected to allow the head of the pin to pass through the larger portion of the keyhole opening. Once the shank of the pin enters the smaller portion of the keyhole opening, the leaf spring springs back to retain the pin. In the meantime, the T-shaped projection has entered the contoured slot, serving to limit the pivoting of the second plate on the pin.

Ogawa Pat. No. 4,473,243 discloses a three-plate arrangement wherein one plate includes a keyhole opening, a second plate includes a bolt-like anchor pin, and the third plate is resiliently deformable but includes an opening for receiving the head of the pin and a small projection for selectively entering small holes formed in the second plate to prevent relative rotation between the plates.

DISCLOSURE OF THE INVENTION

A general object of the invention is to provide an improved readily connectable and disconnectable attachment mechanism for components such as a vehicular shoulder belt, which is compact in structure and efficient in operation.

Another object of the invention is to provide an improved attachment mechanism for a vehicular rear seat shoulder belt which, as a complete unit, is readily disconnectable, leaving only the head of a fixed mounting bolt extending into the interior of the vehicle.

A further object of the invention is to provide an attachment mechanism adaptable to being mounted on a bolt or bolt-like fastener, and including a base member and a cooperating leaf spring locking member, with an intermediate pivotable lever means for moving the leaf spring relative to the base member outwardly past the head of the bolt to permit disconnect of the complete attachment mechanism from the bolt.

Still another object of the invention is to provide an attachment mechanism for connection to a fixed mounting bolt, and including a base member having a keyhole opening formed adjacent one end thereof, a leaf-like spring member secured at one end thereof to the other end portion of the base member, an arcuate notch formed in the distal end of the spring member for retaining the attachment mechanism on the mounting bolt once assembled thereon via the keyhole opening, and a pivotable actuating lever operatively connected to the base and spring members adaptable to release the arcuate notch of the spring member from a position of retention adjacent the mounting bolt.

These and other objects and advantages will become more apparent when reference is made to the following drawings and the accompanying description.

BRIEF DESCRIPTION OF THE DRAWINGS

FIG. 1 is a fragmentary perspective view of a vehicular roof rail to which the apparatus embodying the invention is attached;

FIG. 2 is an enlarged perspective view of an uncovered attachment mechanism embodying the invention;

FIG. 3 is a plan view of the inventive attachment mechanism with a cover therefor in partial cross-section;

FIG. 4 is a side elevational view taken along the plane of the line 4—4 of FIG. 3, and looking in the direction of the arrows;

FIG. 5 is a fragmentary view similar to FIG. 3 in a different operational position; and FIG. 6 is a side elevational view taken along the plane of the line 6—6 of FIG. 5, and looking in the direction of the arrows.

BEST MODE OF CARRYING OUT THE INVENTION

Referring now to the drawings in greater detail, FIG. 1 illustrates a rear seat belt attachment mechanism 10 in position on the roof rail 12 above a rear automotive side window 14, with a shoulder belt 16 looped through an oval-shaped ring 18 of the attachment mechanism 10. An actuating button 20 of the mechanism is shown extended through an opening 22 formed in a plastic decorative cover 24 toward the vehicle interior.

The seat belt attachment mechanism 10 within the cover 24 is shown in FIG. 2. It includes a base member 26 having the oval-shaped ring 18 formed on the lower end thereof, which is covered by any suitable protective plastic material (not shown). More specifically, the oval-shaped ring 18 is formed to extend from a bent portion 28 of the base member 26. A pivot pin 30 (FIG. 4) is secured to extend laterally across the center portion of the base member 26 or, alternately, may be formed as an integral portion of the base member 26. The length of the pivot pin 30 is such that the oppositely disposed ends 32 (FIG. 2) thereof extend beyond the respective side edges of the base member 26.

A keyhole shaped opening 34 having a circular lower portion 36 and a narrower slotted upper portion 38 is formed in the base member 26 adjacent the upper end portion thereof. The keyhole opening 34 is such that the circular portion 36 mounts over the head 40 (FIG. 4) of a mounting bolt 42 and the slotted portion 38 fits around the shank 44 of the bolt. The bolt is secured at the threaded end (not shown) thereof to the roof rail 12.

A leaf-like spring member 50 is secured at a bent lower end portion 52 to the base member 26 by rivets 54 (FIG. 2), and extends upwardly parallel to the main portion of the base member 26. The upper distal end portion of the spring member 50 includes a segment 56 bent to extend inwardly (FIGS. 2 & 4) toward the base member 26, terminating in a straightened end segment 58 abutting against the base member. An arcuate notch 60 (FIGS. 2 & 3) is formed in the center of the end segment 58 adjacent the location just below the slotted upper portion 38 of the keyhole opening 34 for a purpose to be described. An opening 62 is formed in the spring member 50 adjacent the pivot pin 30.

A plastic lever 64 is molded to include a central portion 66 which is adapted to fit within the opening 62 in the spring member 50. A pair of shoulders 68 extend outwardly from the respective side edges of the lever 64 adjacent the pivot pin 36 and beneath the spring member 52. A U-shaped rocker flange 70 (FIGS. 2 & 4) is formed on the distal end of each shoulder 68 such that it mounts around the respective end 32 of the pivot pin 30 to serve as pivot points, as will be explained.

An arm 72 (FIG. 4) extends from each shoulder 68 toward the bent segment 56 of the spring member 50, intermediate the spring member and the base member 26. A rounded protrusion 74 is formed adjacent the distal end of each arm 72 for abutting against the inner adjacent surface of the spring member 50. An outwardly sloping segment 76 FIG. 4) is formed to extend from the central portion 66 through the opening 62 of the spring member 50 toward the oval-shaped ring 18 end of the mechanism 10. The actuating button 20 is formed on the sloping segment 76 to extend through the opening 62.

To install the attachment mechanism 10, with the shoulder belt 16 looped through the oval-shaped ring 18, onto the fixed mounting bolt 42, one need only position the circular portion 36 of the keyhole opening 34 in alignment with the head 40 of the bolt 42 and push the mechanism against the head to thereby urge the end segment 58 outwardly away from the base member 26 until the bolt head 40 passes through the circular opening portion 36, at which point the mechanism 10 is pulled downwardly so as to position the slotted portion 38 of the keyhole opening 34 onto the shank 44 of the bolt 42. During the latter pull-down movement, once the arcuate notch 60 of the end segment 58 clears the bolt head 40, the end segment 58 will snap back against the base member 26, and the bolt head will become positively confined by virtue of the arcuate notch 60 being positioned adjacent thereto so as to either abut thereagainst or to slide therebeneath in the event any attempt is made to move the mechanism 10.

If necessary, a finger 80 (FIGS. 2 and 4) may be formed on the central outer surface of the spring member 50 at the juncture with the bent segment 56 so as to extend just past and against the edge portion of the bolt head 40 to prevent any rattling between the attachment mechanism 10 and the bolt 42.

To remove the attachment mechanism 10 from the mounting bolt 42, as, for example, when the vehicle owner wishes to remove the rear seat of a station wagon, depressing the actuating button 20 until the sloping segment 76 contacts the base member 26 (FIG. 6) causes the rounded protrusions 74 at the ends of the arms 72 to push the spring member 50 outwardly and, hence, lift the arcuate notch 60 past the bolt head 40. Thereafter, it is merely necessary to lift the mechanism 10 upwardly, as indicated by the relative positions shown in FIG. 6, while holding the actuating button 20 in its depressed condition, and to pull the circular portion 36 of the keyhole opening 34 around and past the bolt head 40, and then releasing the actuating button 20, thereby totally freeing the attachment mechanism 10 and the associated shoulder belt 16 from the mounting bolt 42.

INDUSTRIAL APPLICABILITY

It should be apparent that the invention provides an efficient and readily connectable and disconnectable attachment mechanism for a rear seat shoulder belt, which is positively engaged while installed on a mounting bolt.

It should also be apparent that such an attachment mechanism would be suitable for applications other than for vehicular shoulder belts.

It should be further apparent that, in lieu of the pivot pin 30, trunnion portions may be cut into or formed as integral parts of the respective edges of the base member.

While but one embodiment of the invention has been shown and described, other modifications thereof are possible within the scope of the following claims.

The embodiments of the invention in which an exclusive property or privilege is claimed are defined as follows:

1. An attachment mechanism comprising a base member having a keyhole opening formed adjacent one end thereof adaptable to mounting around and on a fixed mounting member, connector means formed at the other end thereof, leaf-spring means having one end thereof attached adjacent said other end of said base member, retainer means formed on the distal end of said leaf-spring means adjacent said keyhole opening adaptable to retaining said attachment mechanism on said fixed mounting member, and manually operable actuating means operatively associated with said leafspring means and said base member adaptable to disconnecting said retainer means from said fixed mounting member.

2. The attachment mechanism described in claim 1, wherein said connector means is an oval-shaped loop for slidably retaining a shoulder belt therein.

3. The attachment mechanism described in claim 1, wherein said fixed mounting member is a bolt threadedly secured to a fixed abutment.

4. The attachment mechanism described in claim 3, wherein said retainer means is an arcuate notch concentric with and positioned adjacent the head of said bolt.

5. The attachment mechanism described in claim 4, and a pivot pin secured across a central portion of said base member with said pivotable release means mounted on said pivot pin and including lifting means for raising said leaf-spring and said arcuate notch past the head of said bolt to permit the attachment mechanism to be removed form said bolt via said keyhole opening.

6. The attachment mechanism described in claim 5, and an opening formed in said leaf-spring means adjacent said pivot pin, wherein said lifting means includes a central portion extending through said opening, an actuating button formed on said central portion, and a pair of spaced arms extending from said central portion intermediate said leaf-spring means and said base member adaptable to lifting said leaf-spring means and thereby lifting said retainer means past said bolt head.

7. An attachment mechanism comprising a base member having a keyhole opening formed adjacent one end thereof adaptable to mounting around and on a fixed mounting member, connector means formed on the other end thereof; a leaf-like spring member having one end thereof attached adjacent the connector means, and including a bent portion formed adjacent the distal end thereof, and a flat terminal end portion formed at the end of the bent portion, an arcuate notch formed at the center of the terminal end portion concentric with and positioned adjacent said fixed mounting member, and an opening formed in the central portion thereof; pivot means formed at the edges of a central portion of said base member adjacent said opening; and pivotable actuating means including a central portion extending into said opening, U-shaped extensions formed at both sides of the central portion pivotally mounted on the pivot means at the edges of the central portion of the base member, a pair of spaced arms extending from the central portion intermediate the leaf-like spring member and the base member, a sloped portion formed to extend into said opening from the central portion on the end thereof opposite the pair of spaced arms, and an actuating button formed on the outer surface of the sloped portion adapted upon being depressed to pivot said pair of spaced arms to thereby lift the leaf-like spring member and, hence, the arcuate notch past the fixed mounting member, permitting the attachment mechanism to be lifted off the fixed mounting member through said keyhole opening.

* * * * *